United States Patent

Vogel et al.

[11] Patent Number: 5,508,840
[45] Date of Patent: Apr. 16, 1996

[54] LIGHT MODULATOR

[75] Inventors: Paul Vogel, Steffisburg; Rainer Bättig, Berne, both of Switzerland

[73] Assignee: Ascom Tech Ltd., Berne, Switzerland

[21] Appl. No.: 153,984

[22] Filed: Nov. 18, 1993

[30] Foreign Application Priority Data

Nov. 20, 1992 [CH] Switzerland ............... 03566/92

[51] Int. Cl.⁶ ............................................. G02B 26/00
[52] U.S. Cl. ..................... 359/291; 359/263; 356/358
[58] Field of Search .................... 359/249, 263, 359/260, 291, 318; 285/9, 18; 356/357, 358

[56] References Cited

U.S. PATENT DOCUMENTS 4,558,950  12/1985  Ulrich et al. ................ 356/345

FOREIGN PATENT DOCUMENTS

0420468A2  4/1991  European Pat. Off. .
4031970A1  4/1992  Germany .

Primary Examiner—Georgia Y. Epps
Assistant Examiner—Thomas Robbins
Attorney, Agent, or Firm—Burns, Doane, Swecker & Mathis

[57] ABSTRACT

A light modulator useful for modulating a diverging light beam exiting from an optical fiber. In one embodiment, the modulator has a focusing lens and two flat partial mirrors. The lens collimates the light, one half of which respectively strikes each of the partial mirrors orthogonally. These mirrors reflect the light back onto itself causing, depending on the relationship between the wavelength of the incident light and the differences in path lengths, varying degrees of constructive or destructive interference. The difference in path length can be varied electrically if the partial mirrors are embodied as etched semiconductor foils which are controllably displaced in an electrostatic field set up between the foils and a substrate electrode.

17 Claims, 2 Drawing Sheets

LIGHT MODULATOR

FIELD OF THE INVENTION

The present invention relates to a light modulator for modulating the intensity of a light beam exiting an optical fiber, and, more particularly, to a light modulator having a displaceable mirror for reflecting such a light beam.

BACKGROUND OF THE INVENTION

One type of optical reflection modulator is known from German Patent Publication DE 40 31 970. In the arrangement disclosed in the German Patent Publication, light exiting the blunt end of an optical fiber strikes a mirror disposed orthogonally to the fiber. This mirror reflects the light back onto itself, thus creating a standing wave in the manner of a Fabry-Perot resonator between the reflecting fiber end and the mirror, provided their distance from each other corresponds to a multiple of half a wavelength of the light used. By changing the distance between the reflecting fiber end and the mirror, particularly by displacing the mirror, the Fabry-Perot resonator can be detuned and the intensity of the light can be changed.

The described modulator is of a relatively simple design and has good modulating properties. However, it is dependent on the absolute value of the distance between the fiber end and the mirror, which changes because of many effects, for example, as a function of the temperature. It is therefore necessary to provide a regulator which maintains the "optical distance" between the reflecting fiber end and the mirror constant.

There is thus a need for a light modulator having modulating properties comparable to those of prior devices, but which does not require maintaining a length constant. There is also a need for a highly sensitive light modulator which is nevertheless of a simple design. There is also a need to achieve these ends in a modulator of the species of optical reflection modulators with movable mirror surfaces.

SUMMARY OF THE INVENTION

The present invention meets these needs by providing a modulator for modulating the intensity of a light beam which exits and reenters an optical fiber, the light modulator including a first mirror arranged to reflect a first substantial portion of the light beam emerging from said optical fiber back into said optical fiber and a second mirror arranged next to the first mirror to reflect a second substantial portion of the light beam emerging from the optical fiber back into said optical fiber. A length of a path traversed by light exiting the optical fiber, being reflected by the second mirror, and returning to the optical fiber is controllably variable with respect to a length of a path traversed by light exiting the optical fiber, being reflected by the first mirror, and returning to the optical fiber so that light reflected by the second mirror interferes a controllable amount with light reflected by the first mirror.

BRIEF DESCRIPTION OF THE DRAWINGS

These and other features of the invention will be described in detail below by way of example by means of four drawing figures, in which.

DETAILED DESCRIPTION OF PREFERRED EMBODIMENTS

Figure 1:
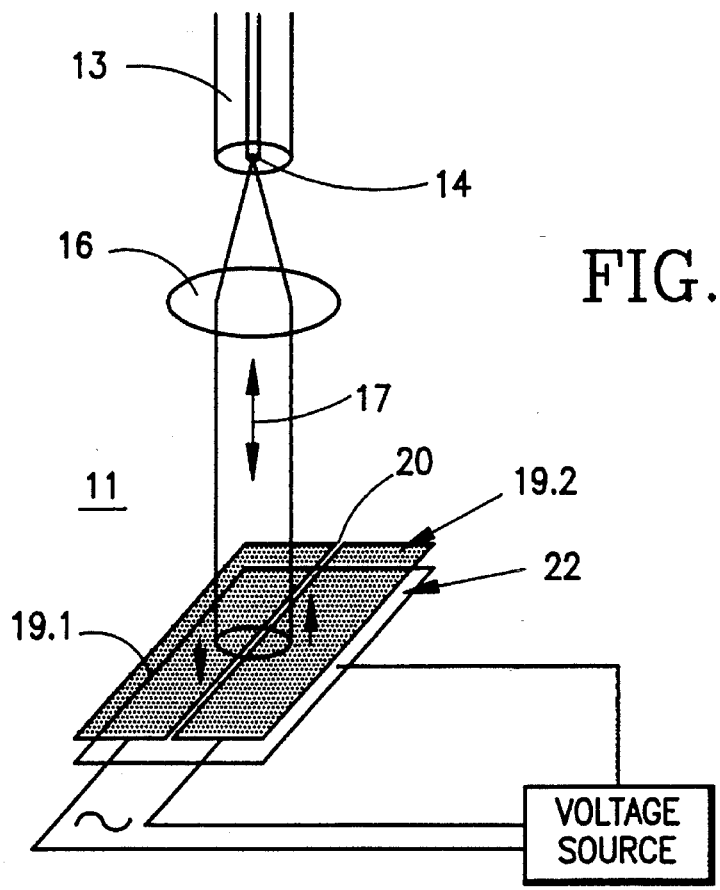
FIG. 1 is a perspective principal view of a first embodiment of a modulator according to the present invention.

FIG. 1 is a principal, perspective view of a first embodiment of a modulator 11. The light reaches the modulator 11 via an optical fiber 13, for example a monomode glass fiber. The light exits through the end of the fiber 13, widens conically in a known manner and is collimated by a focusing lens 16, one focus of which is located at the light exit point 14. The relatively wide, collimated light beam strikes a two-part mirror 19 disposed orthogonally with respect to the light beam in such a way that each partial mirror 19.1 and 19.2 receives approximately the same amount of light. The incoming light is reflected back onto itself because of the orthogonality, is focused by the focusing lens 16 and is finally fed back into the optical fiber 13. This is indicated by the two-headed arrow 17.

The two partial mirrors 19.1, 19.2 are flat and in a rest position are located at the same level or in the same plane. Because of this there is no phase difference between the light which was reflected by the two partial mirrors, and the returning light beam remains undisturbed.

The situation is different if the two partial mirrors are located on different levels, that is, at different distances from the end of the optical fiber 13. In this case a phase difference, which is a function of the difference in the levels, occurs between the partial light beams reflected by the two partial mirrors 19.1, 19.2, which weakens the reflected total light beam to a lesser or greater degree because of interference and thus modulates it. An arbitrary, absolute length is thus not important. Instead, the relative difference in distance and the resultant phase difference are important. In this way all external influences are largely removed. For example, temperature fluctuations have no effect on the modulation depth.

It is generally true that the phase difference is caused by a relative movement of the two partial mirrors 19.1, 19.2. The relative movement can be achieved in that one partial mirror, for example 19.1, is fastened stationary and the other partial mirror 19.2 is orthogonally displaced in relation to its mirror surface. The direction, whether to the front or the back, does not matter in this case. However, it is also possible to displace both partial mirrors simultaneously, for example at different distances in the same direction or preferably at the same distance in opposite directions. In the latter case a displacement of each partial mirror 19.1, 19.2 by one-eighth of a wavelength of the incident light is sufficient to modulate or digitally switch the light from maximum brightness to minimum brightness or maximum extinction. With a typical wavelength of, for example, 3100 nm, this means a deflection of the partial mirrors 19.1, 19.2 by respectively only 400 nm.

As already mentioned, each partial mirror should reflect one half of the incoming or outgoing light. If this is not exactly the case, a reduced modulation depth results. However, this does not depend on the shape of the mirror. Instead of the flat partial mirrors 19.1, 19.2 shown in FIG. 1, it is therefore possible to form the surface of the one partial mirror circularly and to dispose this partial mirror in the sector of the circle of the second partial mirror.

Figure 2:
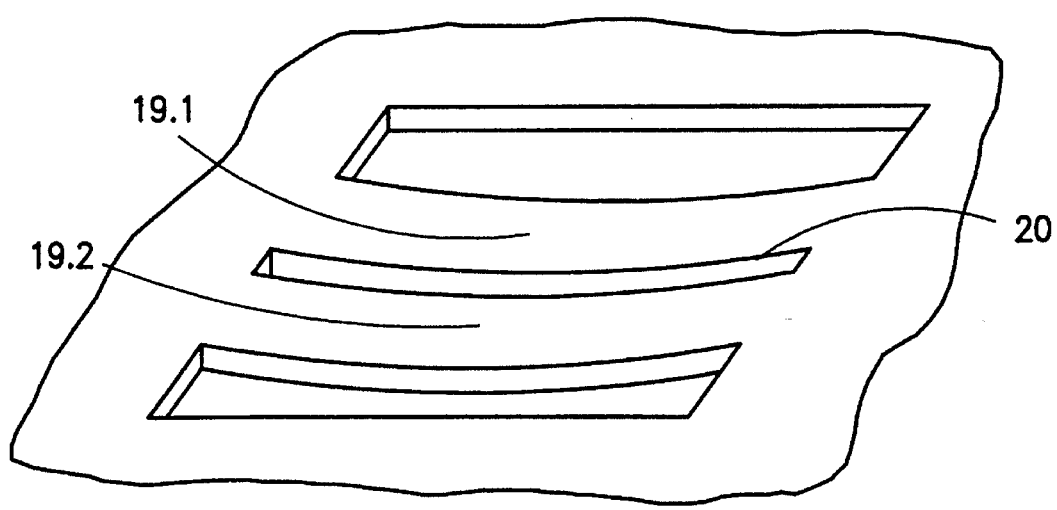
FIG. 2 is an enlarged view of detail of the modulator shown in FIG. 1.

FIG. 2 shows a greatly enlarged detail view of the partial mirrors 19.1, 19.2. In this preferred embodiment the partial mirrors constitute two stretched foils disposed next to each other. The tension of the partial mirrors is generated by the effect of variable electrostatic forces between the foils, which are fastened on two sides, and an adjacent control plate with two control electrodes. When an electrical voltage is applied between a conducting layer of the partial mirrors 19.1, 19.2, in particular a metallic reflecting layer applied by vacuum evaporation, and the control electrodes, the partial mirrors 19.1, 19.2 bend in the shape of an arc. It is now advantageous to prestress the two partial mirrors mechanically in the same way by means of a constant mutual electrical pre-tension. In this way a stable base position of the partial mirrors 19.1, 19.2 is achieved, from which the partial mirrors can be deflected in opposite directions. In the course of this it is necessary to superimpose, for example a common control voltage for the two partial mirrors 19.1, 19.2, in an opposite direction to the electrical pre-tension. As mentioned, in the course of this only small mechanical deflections are required for digital switching to "light/dark".

The requirement for flat partial mirrors 19.1, 19.2 is not completely necessary in the embodiment according to FIG. 2. As described, the partial mirrors of this embodiment are formed slightly arched. If no optical correction is made, this of course has a certain influence on the interference behavior between the two reflected partial light beams. However, these influences do not have a basic effect. The total behavior of the modulator 11 is fully preserved.

Figure 3:
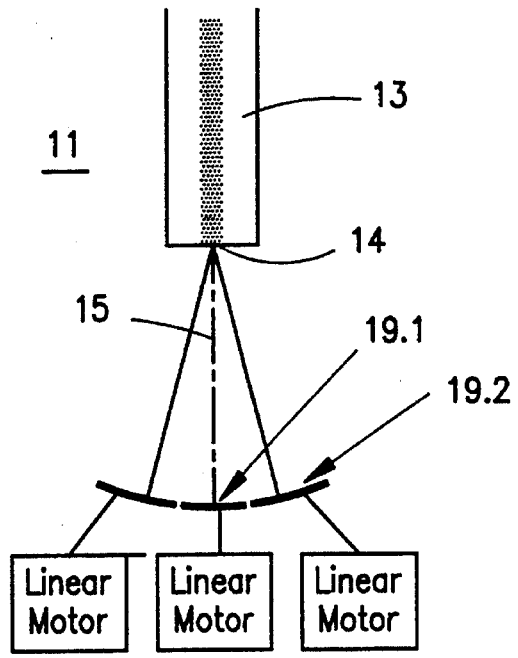
FIG. 3 is a sectional through a second embodiment of a modulator according to the present invention.

FIG. 3 shows a section through a second embodiment of a modulator 11. In this second embodiment, the partial mirrors 19.1, 19.2 are concavely bent in a deliberate variation from the flat mirror. The inner partial mirror 19.1, disposed centered in relation to the optical axis 15 defined by the optical fiber 13, forms a spherical segment. The second partial mirror 19.2 has a circular recess, in which the first partial mirror 19.1 is disposed. The partial mirrors 19.1, 19.2 complement each other to form a larger spherical segment. The center of this spherical segment is located in the light exit point 14 of the optical fiber 13. Because of this, a focusing lens 16 in accordance with FIG. 1 can be omitted, since all of the light is always reflected back to the point 14 of the fiber 13, regardless of its spatial exit angle.

As shown, electrically actuable solid body elements which support the mirror(s), can be used as linear drives for the linear movement of one or both partial mirror(s) 19.1, 19.2 of FIG. 3, which support the partial mirror(s). Such solid body elements may be piezoelectrical modulators, for example quartz.

It is also possible to embody the partial mirrors 19.1, 19.2 of FIG. 3, similar to those of FIG. 2, as diaphragms, and to deflect them using a substrate 22. Such diaphragms can be produced relatively without problems by directed etching of doped semiconductors, for example silicon monocrystalline disks with suitable pn-doped layers. By vacuum-evaporation of metallic layers it is then possible to create the mirror properties as well as electrodes for applying the electrostatic voltages which cause the deflection of the partial mirrors 19.1, 19.2. In this way it is possible in a cost-effective manner to produce very small and compact modulators 11, which operate dependably up into the MHz range. Triggering of such modulators 11 only requires relatively low voltages and almost no current.

Figure 4:
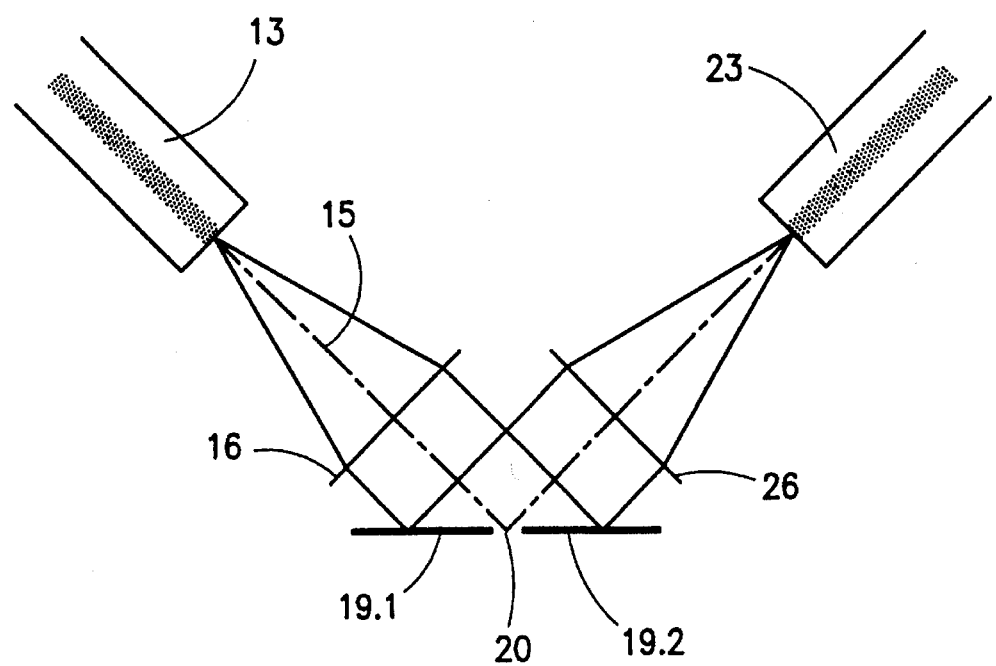
FIG. 4 is a view of a third embodiment of a modulator according to the present invention.

FIG. 4 shows a third embodiment of a modulator 11. Here, the incoming light beam, collimated by the focusing lens 16, does not strike the two partial mirrors 19.1, 19.2 orthogonally, but obliquely at an angle which is freely selectable to a large extent. A second focusing lens 26 is required with this modulator 11, which focuses the reflected partial beams and feeds them to the inlet 24 of a second outgoing optical fiber 23. Modulation of a continuous light beam is possible with this modulator, the direction in which the light travels not making any difference.

Besides the described variants, there is a number of further variants, some of which are mentioned below:

the focusing lenses 16 and 26 can be replaced by other optical means having the same effect, for example by sets of lenses or spherical mirrors.

the modulator 11 described in connection with FIG. 3 can be altered in such a way that, instead of back-reflection into the one optical fiber 13, the reflected light is fed to a second optical fiber 23. In this case a second arrangement for modulating a continuous light beam results.

it is advantageous to dispose the two partial mirrors 19.1, 19.2 in a common plane. However, it is also possible to provide considerably different planes.

It should be mentioned in closing that the type of the described modulation in all cases represents a modulation of the light intensity or the intensity of a beam guided in an optical fiber. More specifically, this modulation can also be considered to be an amplitude modulation and can be used, for example, for purposes of information transmission. The degree of the modulation in this case depends on how much light the two partial mirrors 19.1, 19.2 contribute in relation to the interference process. If the two interfering light intensities are the same, a maximum modulation degree is the result. However, if the two interfering light intensities are of different strengths, a clearly reduced degree of modulation results. In any event, it is important that each one of the two partial mirrors 19.1, 19.2 reflect an essential portion of the total light emanating from the optical fiber 13 and subsequently brings it to interference.

What is claimed is:

1. A modulator for modulating the intensity of a light beam which exits and reenters an optical fiber, said modulator comprising:

a first mirror arranged to reflect a first portion of said light beam emerging from said optical fiber back into said optical fiber;

a second mirror arranged next to said first mirror to reflect a second portion of said light beam emerging from said optical fiber back into said optical fiber; and means for driving said first mirror with respect to said second mirror in a direction of an optical path of said light beam in such a way that a phase of said first portion is controllable with respect to a phase of said second portion at a light re-entering point of said optical fiber.

2. A modulator in accordance with claim 1, wherein said first and second mirrors are arranged such that said first and second portions are approximately equal in intensity.

3. A modulator in accordance with claim 1, wherein each of said first and second mirrors are flat and arranged orthogonally with respect to the axis of said optical fiber, and further including optical means positioned between the optical fiber and the first and second mirrors for collimating said light beam, one focus of said optical means being located at the light exit point of said optical fiber in such a way that said light is reflected back into itself.

4. A modulator in accordance with claim 3, wherein said optical means comprises a focusing lens.

5. A modulator in accordance with claim 3, wherein said first and second mirrors are located in a common plane as a rest position and are displaceable in opposite directions from each other.

6. A modulator in accordance with claim 1, wherein said first mirror is disposed in a circular recess of said second mirror, wherein both of said first and second mirrors are concave such that together they form a spherical section having a section axis common to both mirrors, with the center of the section being located at a light exit point of said optical fiber in such a way that said light beam is reflected back into itself.

7. A modulator in accordance with claim 6, wherein the first mirror is displaceable and the second mirror is maintained stationary.

8. A modulator in accordance with claim 1, wherein said first and second mirrors comprise at least one vacuum-evaporated diaphragm, and wherein said means for driving comprises at least a first substrate associated with said diaphragm and a generator for generating electrical control voltages applicable between said diaphragm and said substrate.

9. A modulator in accordance with claim 8, wherein said first and second mirrors further comprise a second vacuum-evaporated diaphragm, and wherein said means for driving comprises a second substrate associated with said second diaphragm, and wherein said generator additionally generates electrical control voltages applicable between said second diaphragm and said second substrate.

10. A modulator in accordance with claim 1, wherein said first and second mirrors are disposed on a piezoelectric material.

11. A modulator for modulating the intensity of a light beam, said modulator comprising:

a first mirror arranged nonorthogonally with respect to a direction of propagation of a light beam exiting a first optical fiber to reflect a first portion of said light beam emerging from said first optical fiber; and a second mirror arranged next to said first mirror and nonorthogonally with respect to a direction of propagation of a light beam exiting said first optical fiber to reflect a second portion of said light beam emerging from said first optical fiber;

a first optical means positioned between said first optical fiber and said first and second mirrors for collimating said light beam, one focus of said first optical means being located at a light exit point of said first optical fiber;

a second optical means positioned between a second optical fiber and said first and second mirrors for collimating said light beam, one focus of said second optical means being located at a light entering point of said second optical fiber; and means for driving said first mirror with respect to said second mirror to control a phase of said first portion with respect to a phase of said second portion where said first portion and second portion enter said second optical fiber.

12. A modulator in accordance with claim 11, wherein said first and second optical means each comprises a focusing lens.

13. A modulator in accordance with claim 11, wherein said first and second mirrors are located in a common plane as a rest position and are displaceable in opposite directions from each other.

14. A modulator in accordance with claim 11, wherein each of said first and second mirrors is flat.

15. A modulator for modulating the intensity of a light beam, said modulator comprising:

a first mirror arranged to reflect a first portion of said light beam emerging from an emitting optical fiber;

a second mirror arranged next to said first mirror to reflect a second portion of said light beam emerging from said emitting optical fiber; and means for driving said first mirror with respect to said second mirror to control a phase of said first portion with respect to a phase of said second portion where said first portion and second portion enter a receiving optical fiber.

16. A modulator in accordance with claim 15 wherein said emitting optical fiber and said receiving optical fiber are the same optical fiber.

17. A modulator in accordance with claim 15 wherein said emitting optical fiber comprises a first optical fiber and said receiving optical fiber comprises a second optical fiber.

* * * * *